(12) United States Patent
Nishide

(10) Patent No.: US 10,234,650 B2
(45) Date of Patent: Mar. 19, 2019

(54) LENS BARREL

(71) Applicant: CANON KABUSHIKI KAISHA, Tokyo (JP)

(72) Inventor: Akihiko Nishide, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/643,697

(22) Filed: Jul. 7, 2017

(65) Prior Publication Data

US 2018/0011279 A1 Jan. 11, 2018

(30) Foreign Application Priority Data

Jul. 8, 2016 (JP) ................................. 2016-136009

(51) Int. Cl.
| | |
|---|---|
| *G02B 5/20* | (2006.01) |
| *G02B 3/00* | (2006.01) |
| *G02B 7/00* | (2006.01) |
| *G02B 7/09* | (2006.01) |
| *G02B 7/10* | (2006.01) |
| *G02B 27/10* | (2006.01) |

(52) U.S. Cl.
CPC ............... *G02B 7/006* (2013.01); *G02B 7/09* (2013.01); *G02B 7/102* (2013.01); *G02B 27/102* (2013.01)

(58) Field of Classification Search
CPC .... G02B 13/004; G02B 13/0035; G02B 9/34; G02B 1/041
USPC ................................. 359/721–723, 356, 359
See application file for complete search history.

(56) References Cited

U.S. PATENT DOCUMENTS

| | | | |
|---|---|---|---|
| 2011/0141565 A1 | 6/2011 | Suzuka | |
| 2014/0313602 A1* | 10/2014 | Kudoh | ................... G02B 7/102 359/817 |

FOREIGN PATENT DOCUMENTS

JP  5759120 B  8/2015

OTHER PUBLICATIONS

The above patent documents were cited in a European Search Report dated Nov. 20, 2017, which is enclosed, that issued in the corresponding European Patent Application No. 17179971.1.

* cited by examiner

*Primary Examiner* — William R Alexander
*Assistant Examiner* — Tamara Y. Washington
(74) *Attorney, Agent, or Firm* — Cowan, Liebowitz & Latman, P.C.

(57) ABSTRACT

A lens barrel that achieves modes with and without an optical element while reducing a size in an optical axis direction. A first drive mechanism moves a first optical element in the optical axis direction. A second optical element is located at an image surface side of the first optical element and is selectively inserted in an optical path. A second drive mechanism moves a holding member that holds the second optical element in a direction different from an optical axis. A control unit controls the first drive mechanism to move the first optical element to an object side to a position where the first optical element and the holding member are not in an overlap state when viewing in a direction perpendicular to the optical axis, controls the second drive mechanism to remove the second optical element from the optical path, when they are in the overlap state.

7 Claims, 8 Drawing Sheets

LENS BARREL

BACKGROUND OF THE INVENTION

Field of the Invention

The present invention relates to a technique to insert and remove an optical element, such as an optical filter, into and from an optical path of an image pickup optical system.

Description of the Related Art

Lens barrels having zoom mechanisms and focusing mechanisms, and image pickup apparatuses equipped with such lens barrels are known conventionally. Moreover, a need of miniaturization of an apparatus is growing in recent years. In order to miniaturize an image pickup apparatus, it is effective to shorten length of a mounted lens barrel in an optical axis direction.

There is a known lens barrel having a function to insert and remove an optical filter as an optical element into and from an optical path in addition to the zoom mechanism and the focusing mechanism. An infrared cut filter (infrared light removal filter) that has a characteristic to intercept infrared light is known as an optical filter, for example. Photographing modes are switchable by inserting and removing the infrared cut filter into and from the optical path.

Many image pickup devices, such as CMOS sensors, have sensitivity not only in visible light but in infrared light. If infrared light enters into a CMOS sensor having such a characteristic, a picked-up image presents a red tone due to an effect of the infrared light. Accordingly, there is what is called a day mode in which an image is picked up while inserting the infrared cut filter into the optical path in order to avoid entering infrared light into the image pickup device. On the other hand, there is what is called a night mode in which an image is picked up while removing the infrared filter from the optical path to take not only visible light but infrared light in dark environment that is under low illumination in order to improve recognition property of an object.

Thus day mode photography and night mode photography are switchable by inserting and removing the infrared cut filter into and from the optical path, which enables photography suitable to photography environment. An optical element that is inserted and removed into and from the optical path is not limited to the infrared cut filter. There is a lens barrel that supports various modes by inserting filters of different characteristics into the optical path alternately. For example, an apparatus disclosed in Japanese Patent Publication No. 5759120 inserts and removes an optical filter into and from an optical path, which enables photography under both visible light and infrared light. Since a focus state of an image pickup optical system varies depending on whether the optical filter is inserted or removed (an insertion/removal state), a position of a focusing lens is changed according to the insertion/removal state.

However, the lens barrel that enables the optical element to insert and remove into and from the optical path is necessary to avoid physical interference certainly between the optical element that is inserted and removed or a holding member thereof and an optical element that is arranged in the optical path or a holding member thereof when the optical element is inserted and removed into and from the optical path. Accordingly, it is necessary to keep sufficient space in the optical axis direction between the removable member that is inserted and removed and a member that is arranged near the removable member. Accordingly, the overall length of the lens barrel tends to become long because intervals between the elements are set long, which causes a problem that miniaturization of the lens barrel or the image pickup apparatus becomes difficult.

SUMMARY OF THE INVENTION

The present invention provides a lens barrel that achieves a mode in which an optical element like an optical filter is used and a mode in which the optical element is not used while making a size in an optical axis direction compact.

Accordingly, an aspect of the present invention provides a lens barrel including a first optical element, a first drive mechanism that moves the first optical element in an optical axis direction of an image pickup optical system, a second optical element that is located at an image surface side of the first optical element and is selectively inserted in an optical path of the image pickup optical system, a holding member that holds the second optical element, a second drive mechanism that moves the holding member that holds the second optical element in a direction different from an optical axis, and a control unit configured to control the first drive mechanism to move the first optical element to an object side to a position where the first optical element and the holding member are not in an overlap state when viewing in a direction that intersects perpendicularly with the optical axis, and then to control the second drive mechanism to remove the second optical element from the optical path, when the second optical element is removed from the optical path and when the first optical element and the holding member are in the overlap state.

According to the present invention, the mode in which the second optical element is used and the mode in which the second optical element is not used are achievable and the size in the optical axis direction is compacted.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
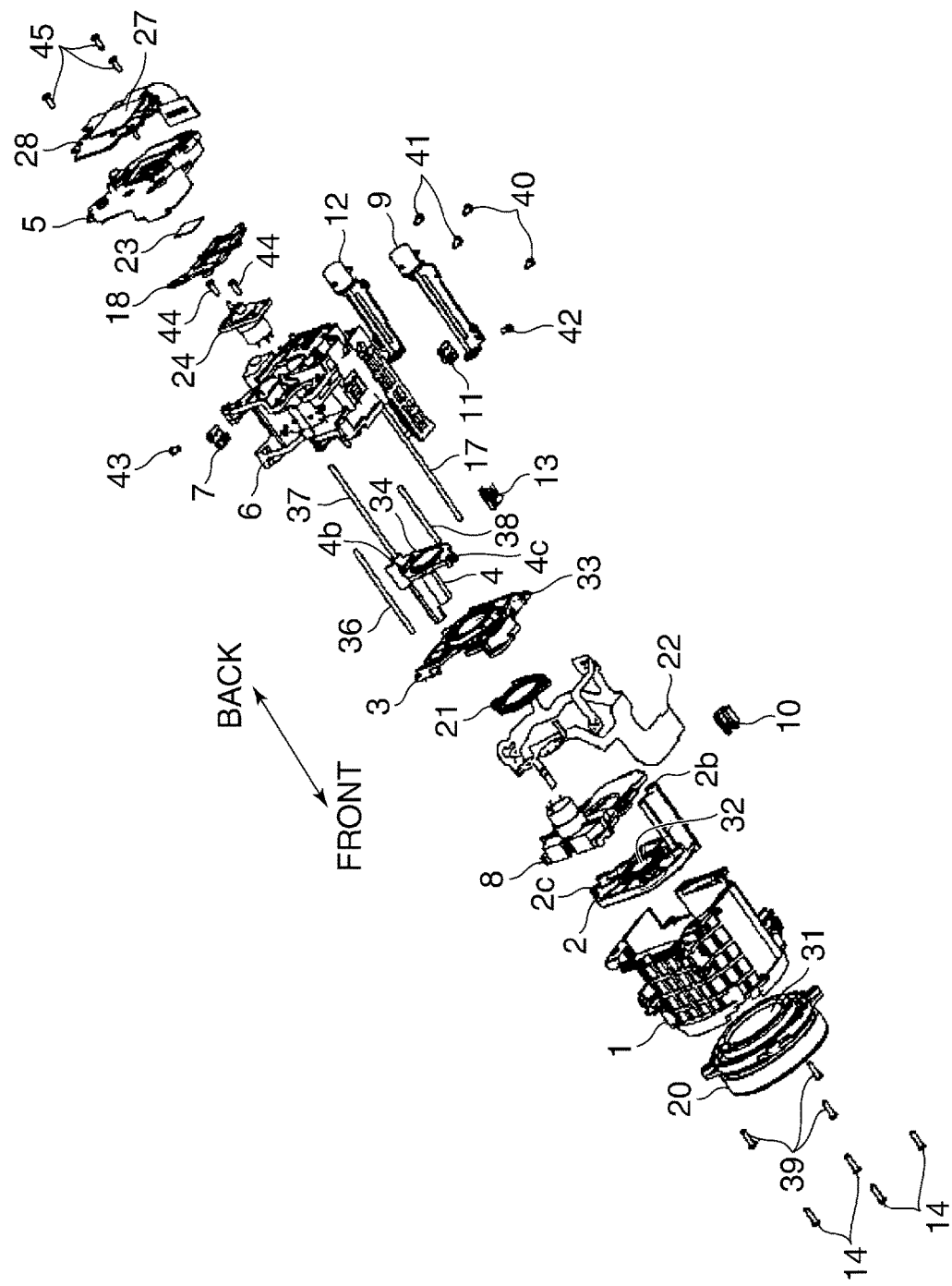
FIG. 1 is an exploded perspective view showing a lens barrel according to an embodiment of the present invention.
Figure 2:
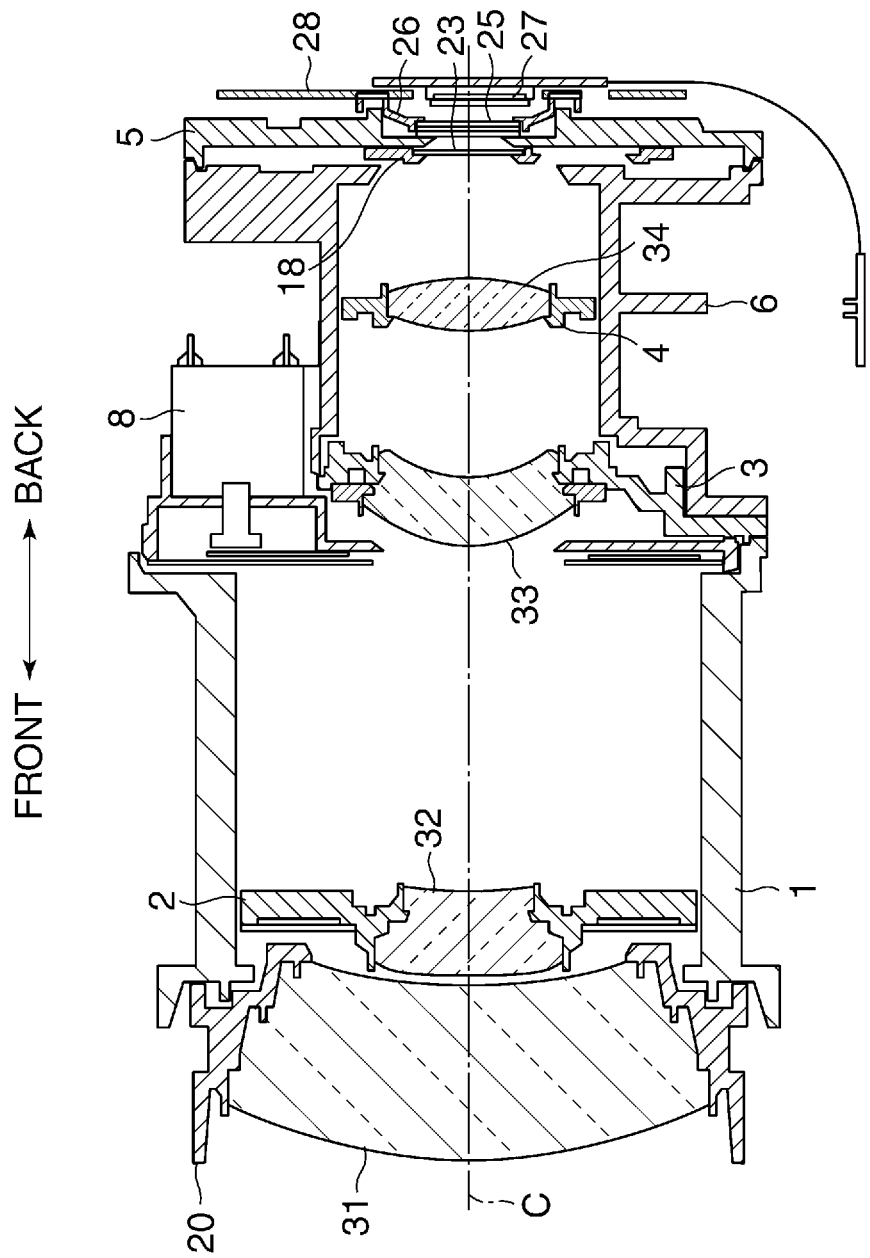
FIG. 2 is a sectional view showing the lens barrel shown in FIG. 1 in a WIDE (infinity) state.

FIG. 1 is an exploded perspective view showing a lens barrel according to an embodiment of the present invention. FIG. 2 is a sectional view showing the lens barrel shown in FIG. 1 in a WIDE (infinity) state. An entire configuration of the lens barrel will be described with reference to FIG. 1 and FIG. 2. The lens barrel in the embodiment is incorporated into an image pickup apparatus, such as a digital camera. However, the lens barrel may be constituted as what is called an interchangeable lens that can be attached and detached to and from a body of an image pickup apparatus.

As shown in FIG. 1, a lens barrel has a first group barrel 20, a front lens barrel 1, a second group barrel 2, a light amount adjustment device 8, a third group barrel 3, a fourth group barrel 4, a rear lens barrel 6, a filter frame (holding member) 18, and an image-pickup-device holding frame 5 that are arranged in this order from an object side. The lens barrel further has a zoom drive motor (hereinafter referred to as a Z motor) 9, and a focus drive motor (hereinafter referred to as an F motor, a first drive mechanism) 12, an infrared cut filter (a second optical element) 23, a filter frame drive motor (hereinafter referred to as a frame motor) 24, an image pickup device 27, and a sensor plate 28. It should be noted that the Z motor 9 and the F motor 12 are stepping motors.

The first group barrel 20 is provided with a lens holding member, fixes and holds a first lens group 31 with the lens holding member by adhesion or heat calking, and is attached to the front lens barrel 1 with screws 14.

The second group barrel 2 holds a second lens group 32, and a zoom rack 10 is attached to the second group barrel 2. Both ends of a first guide bar 17 that supports the second group barrel 2 are respectively held by the first group barrel 1 and the rear lens barrel 6, and both ends of a second guide bar 36 are respectively held by the first group barrel 1 and the third group barrel 3. A sleeve part 2b and a U groove portion 2c of the second group barrel 2 are respectively guided by the first guide bar 17 and the second guide bar 36. The second group barrel 2 is supported by these guides in the front lens barrel 1 so as to be movable in an optical axis direction (a direction parallel to an optical axis C (FIG. 2)). The Z motor 9 is attached to the rear lens barrel 6 with third screws 40, and a zoom rack 10 is screwed to a shaft part of the Z motor 9. Accordingly, the second group barrel 2 is driven by the Z motor 9, and moves in the optical axis direction. A zoom sensor 11 is attached to the rear lens barrel 6 with a fifth screw 42. The zoom sensor 11 detects a reset home position of the second group barrel 2. A home position of the second group barrel 2 is detected by a detection signal of the zoom sensor 11. The Z motor 9 drives the second group barrel 2 on the basis of this home position to change focal length.

The third group barrel 3 holds a third lens group 33 and a third group frame 21, and is held by the rear lens barrel 6. The light amount adjustment device 8 is fixed to the third group barrel 3, and adjusts an amount of light that enters into the image pickup device 27 by moving built-in blades so as to adjust aperture diameter on the optical axis.

The fourth group barrel 4 holds a fourth lens group (a first optical element) 34, and a focal rack 13 is attached to the fourth group barrel 4. Both ends of a third guide bar 37 that supports the fourth group barrel 4 are respectively held by the first group barrel 1 and the rear lens barrel 6, and both ends of a fourth guide bar 38 are respectively held by the third group barrel 3 and the rear lens barrel 6. A sleeve part 4b and a U groove portion 4c of the fourth group barrel 4 are respectively guided by the third guide bar 37 and the fourth guide bar 38. The fourth group barrel 4 is supported by these guides so as to be movable in the optical axis direction. The F motor 12 is attached to the rear lens barrel 6 by fourth screws 41, and the focus rack 13 is screwed to a shaft part of the F motor 12. According to the above-mentioned configuration, the fourth group barrel 4 is driven by the F motor 12 so as to move in the optical axis direction for focusing. A focus sensor 7 is attached to the rear lens barrel 6 by a fifth screw 43. The focus sensor 7 detects a reset home position of the fourth group barrel 4. The F motor 12 is a first drive mechanism that drives the fourth group barrel 4 including the fourth lens group 34.

A lens flexible substrate 22 transfers electric currents from driving units mentioned later to the F motor 12, the Z motor 9, and the light amount adjustment device 8, and transfers signals output from the focus sensor 7 and the zoom sensor 11 to a control unit.

A unit that has the image pickup device 27 is attached to the image-pickup-device holding frame 5. A low pass filter 25 (FIG. 2) removes a high frequency component of the light entering to the image pickup device 27. When the high frequency component of the light is removed, moire, which is generally called false color, is prevented from occurring in a taken image. A sensor rubber 26 (FIG. 2) prevents foreign substances, such as dust, from entering a space between the low pass filter 25 and the image pickup device 27 in order to prevent the foreign substances from displaying in a taken image. The image-pickup-device holding frame 5 holds the sensor plate 28 that holds the image pickup device 27. The image pickup device 27 takes an object image formed through the image pickup optical system. The image pickup optical system consists of the first lens group 31, second lens group 32, third lens group 33, and fourth lens group 34.

Figure 3A:
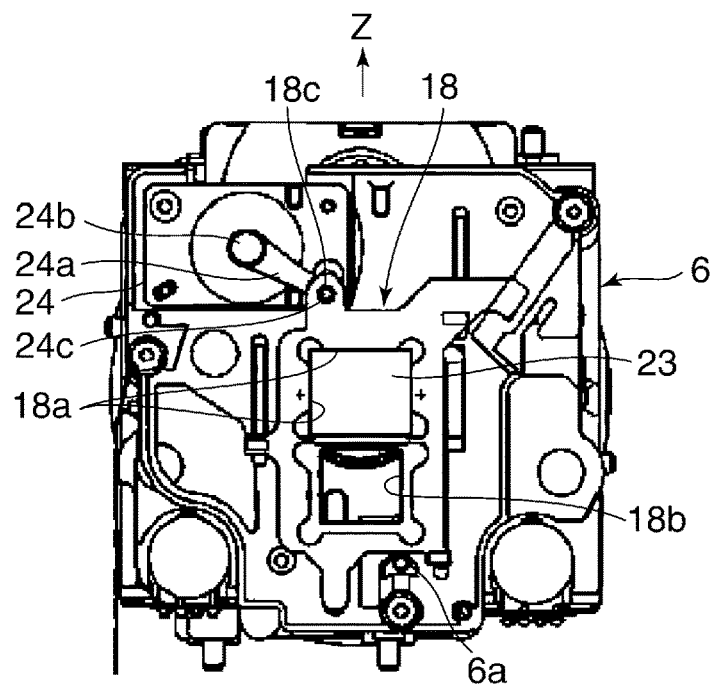
FIG. 3A and FIG. 3B are views showing a configuration around a filter frame holding an infrared cut filter included in the lens barrel shown in FIG. 1.
Figure 3B:
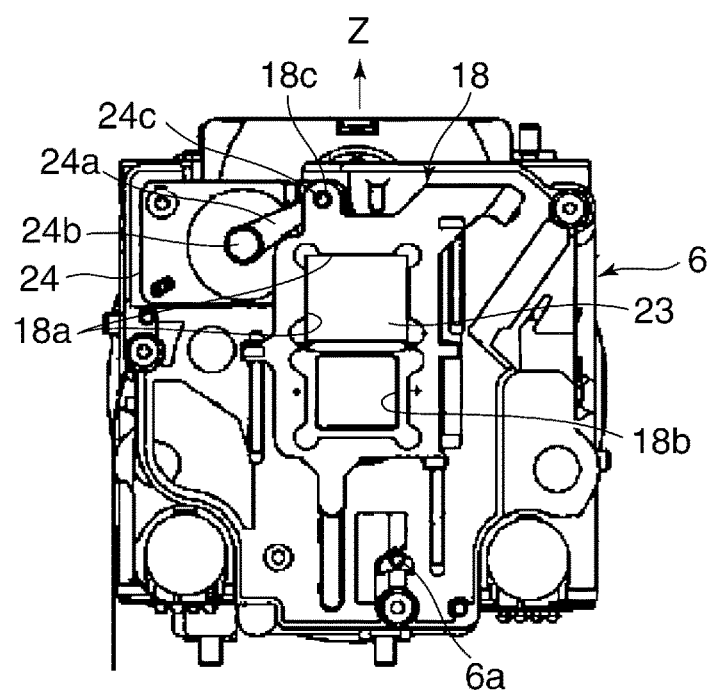

FIG. 3A and FIG. 3B are views showing the configuration around the filter frame 18 holding the infrared cut filter 23. When an object side in the optical axis direction shall be a front side, FIG. 3A and FIG. 3B are the views seen from a back side. FIG. 3A and FIG. 3B do not show the image-pickup-device holding frame 5 and the image pickup device 27. FIG. 3A shows an insertion state in which the infrared cut filter 23 is inserted to the optical axis C (i.e., an optical path) of the image pickup optical system. FIG. 3B shows a removal state in which the infrared cut filter 23 is removed from the optical path.

The filter frame 18 is supported and guided by the rear lens barrel 6 so as to be movable while holding the infrared cut filter 23 in directions that are different from the optical axis C, specifically the Z direction that approximately intersects perpendicularly with the optical axis C and the direction opposite to the Z direction. The infrared cut filter 23 is a glass optical filter that removes infrared light. The filter frame 18 has an attachment part 18a and an opening 18b. The opening 18b is a penetrated hole. The infrared cut filter 23 is adhered and fixed to the filter frame 18 so that a circumference (four sides) is received by the attachment part 18a of the filter frame 18. The frame motor 24 that drives the filter frame 18 is attached to the rear lens barrel 6.

A pin 24c projected from a lever part 24a of the frame motor 24 is loosely fitted to a hole 18c of the filter frame 18. Namely, the pin 24c is fitted to the hole 18c with backlash. Electric power is supplied to the frame motor 24 through the lens flexible substrate 22, and the lever part 24a rotates around a lever shaft 24b. When the lever part 24a rotates, the filter frame 18 moves in a guide direction (a direction parallel to the Z direction) by the rear lens barrel 6. When the filter frame 18 is running against the locator pin 6a formed in the rear lens barrel 6, a movement limit in the direction opposite to the Z direction is prescribed. This position is an appropriate position in a case when an image is picked up while inserting the infrared cut filter 23 into the optical path (FIG. 3A). On the other hand, when the lever part 24a rotates counterclockwise from the state in FIG. 3A, the filter frame 18 moves in the Z direction. Accordingly, the infrared cut filter 23 is removed from the optical path (FIG. 3B). Thus, the frame motor 24 is a second drive mechanism that drives the filter frame 18, and inserts and removes the infrared cut filter 23 to and from the optical path.

The reason why the circumference of the infrared cut filter 23 is received by the attachment part 18a of the filter frame 18 is because optical performances, such as resolution performance, may be lowered due to inclination of the infrared cut filter 23 to the optical axis C in a case of cantilever. Moreover, the reason why the infrared cut filter 23 is made from glass is because plane accuracy is high. That is, a filter made from film tends to generate curvature and wrinkles, and the tendency becomes large under a high temperature and high humidity environment particularly. When curvature and wrinkles occur, optical performances, such as a resolution performance, may deteriorate, ghost that occurs by inter reflections between the filter, an image pickup surface, and the lens surfaces may become large, and a shape of the ghost may become a variant shape that seems strange. Accordingly, the glass filter that hardly generates curvature and wrinkles is employed.

Figure 4A:
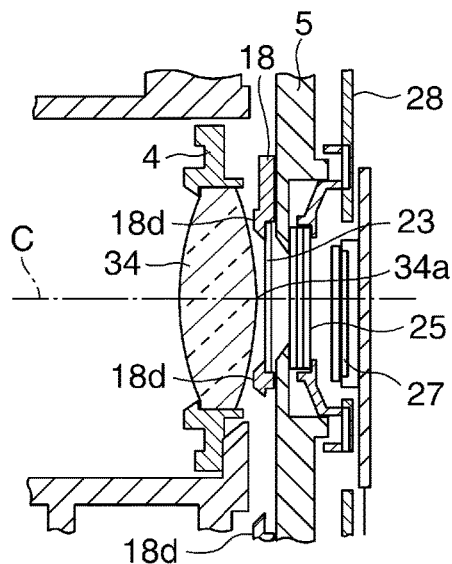
FIG. 4A through FIG. 4D are sectional views showing a fourth group barrel, the filter frame, and the vicinity in the lens barrel shown in FIG. 1.
Figure 4B:
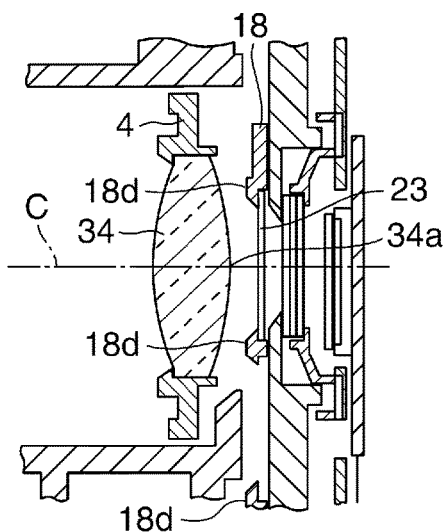
Figure 4C:
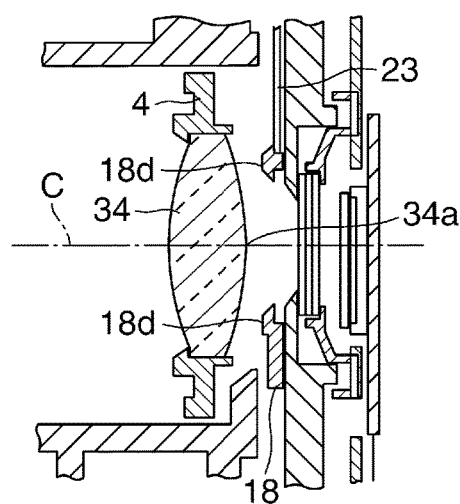
Figure 4D:
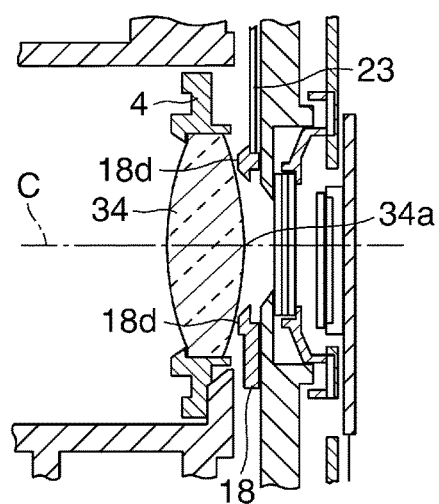

FIG. 4A through FIG. 4D are sectional views showing the fourth group barrel 4, the filter frame 18, and the vicinity in the lens barrel. As mentioned above, the position of the filter frame 18 in the optical axis direction is fixed, but the fourth group barrel 4 moves in the optical axis direction. When the fourth group barrel 4 moves to the most rear side, the filter frame 18 and the fourth lens group 34 that is held by the fourth group barrel 4 enter into an overlap state. Specifically, the overlap state means a state where the fourth group barrel 4 (including the fourth lens group 34) partially overlaps with the filter frame 18 (including the infrared cut filter 23) when viewing in the Z direction. In other words, the overlap state is a state where the filter frame 19 interferes with the fourth group barrel 4 when the filter frame 18 moves in the Z direction or the direction opposite to the Z direction. FIG. 4A and FIG. 4D show the overlap state. FIG. 4B and FIG. 4C since both have estranged to the optical axis direction, it is not an overlap state.

Specifically, in the states shown in FIG. 4A and FIG. 4D, a rear end position 34a that is most protruding to the image pickup device 27 of the fourth lens group 34 is located at the rear side of a front-end face 18d of a filter holding member of the filter frame 18 in the optical axis direction. In the states shown in FIG. 4B and FIG. 4C, the rear end position 34a of the fourth lens group 34 is located at the front side of the front-end face 18d in the optical axis direction.

On the other hand, although the filter frame 18 moves in the Z direction, the fourth group barrel 4 does not move in the Z direction. FIG. 4A and FIG. 4B show an insertion state where the infrared cut filter 23 is inserted into the optical path, and FIG. 4C and FIG. 4D show a removal state where the infrared cut filter 23 is removed from the optical path.

A camera control unit 65 (FIG. 7) mentioned later once moves the fourth group barrel 4 including the fourth lens group 34 to the front side, when the infrared cut filter 23 is inserted into or is removed from the optical path in the above-mentioned overlap state of both the fourth lens group 34 and the filter frame 18. That is, the camera control unit 65 moves the fourth group barrel 4 toward the front side to a position where they are not in the overlap state. Accordingly, the interference between the fourth group barrel 4 including the fourth lens group 34 and the filter frame 18 is avoidable at the time of insertion and removal of the filter frame 18. After inserting or removing the infrared cut filter 23 into or from the optical path, the camera control unit 65 again moves the fourth group barrel 4 to the position where they are in the overlap state.

That is, when the infrared cut filter 23 in the insertion state (FIG. 4A) is removed from the optical path, the camera control unit 65 moves the fourth group barrel 4 to the position shown in FIG. 4B and then removes the infrared cut filter 23 (FIG. 4C). Then, the camera control unit 65 moves the fourth group barrel 4 to the position shown in FIG. 4D. On the other hand, when the infrared cut filter 23 in the removal state (FIG. 4D) is inserted into the optical path, the camera control unit 65 moves the fourth group barrel 4 to the position shown in FIG. 4C and inserts the infrared cut filter 23 (FIG. 4B). Then, the camera control unit 65 moves the fourth group barrel 4 to the position shown in FIG. 4A.

Incidentally, if the fourth group barrel 4 holding a focusing lens shall be focused on an object in the states shown in FIG. 4A and FIG. 4D, the focusing lens in the states shown in FIG. 4B and FIG. 4C will not be focused on the object. The position of the fourth group barrel 4 in the optical axis direction in an insertion-close state (FIG. 4A) differs from that in a removal-close state (FIG. 4D). The position in the removal-close state (FIG. 4 D) is closer to the image pickup device 27. However, the fourth group barrel 4 (including the fourth lens group 34) is not touching the filter frame 18 (including the infrared cut filter 23) in both the states shown in FIG. 4A and FIG. 4D. The reason why the positions of the fourth group barrel 4 differ between FIG. 4A and FIG. 4D is as follows.

First, although the infrared cut filter 23 is attached to the attachment part 18a of the filter frame 18, the opening 18b of the filter frame 18 is a through hole because no filter is attached. Accordingly, the optical path length in the insertion state of the infrared cut filter 23 into the optical path differs from that in the removal state. Moreover, only visible light enters into the image pickup device 27 in the insertion state. On the other hand, infrared light in addition to visible light enters into the image pickup device 27 in the removal state. Aberration varies in response to wavelength of light and the characteristics of the lens. According to these factors, the focused position of the fourth group barrel 4 varies according to the wavelength of the light that enters into the image pickup device 27.

Figure 5:
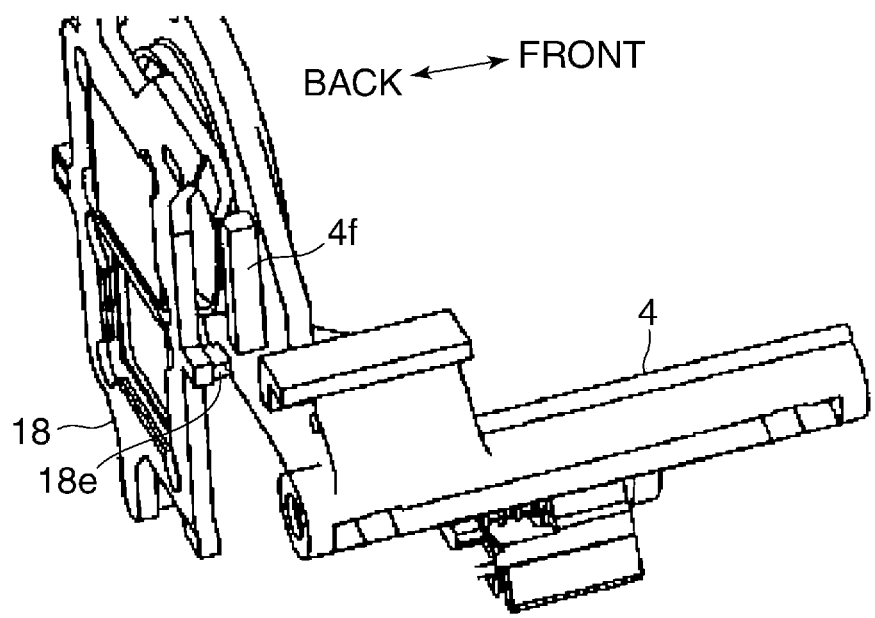
FIG. 5 is a perspective view showing the fourth group barrel and the filter frame included in the lens barrel shown in FIG. 1.
Figure 6A:
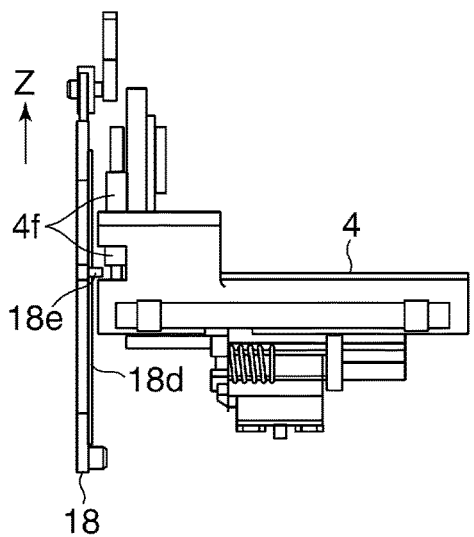
FIG. 6A, FIG. 6B, and FIG. 6C are side views showing the fourth group barrel and the filter frame included in the lens barrel shown in FIG. 1.
Figure 6B:
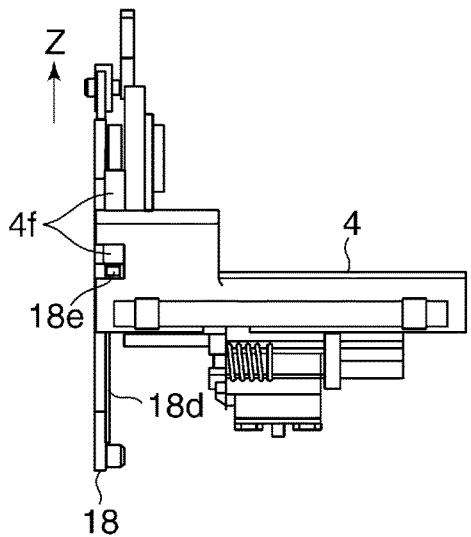
Figure 6C:
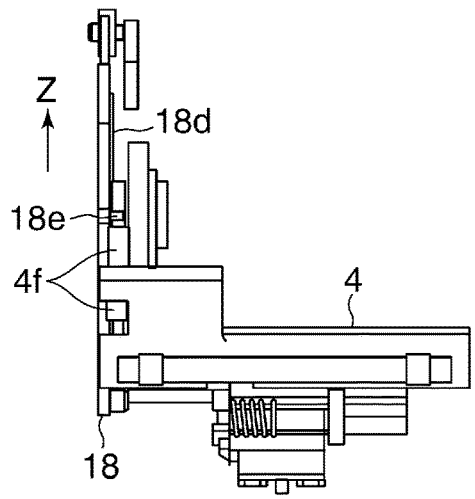

FIG. 5 is a perspective view of the fourth group barrel 4 and the filter frame 18. FIG. 6A, FIG. 6B, and FIG. 6C are side views showing the fourth group barrel 4 and the filter frame 18. FIG. 6A, FIG. 6B, and FIG. 6C correspond to the states shown in FIG. 4B, FIG. 4A, and FIG. 4D, respectively. A mechanism for preventing unexpected movement of the filter frame 18 in the Z direction due to an impact etc. will be described with reference to FIG. 5, FIG. 6A, FIG. 6B, and FIG. 6C.

The filter frame 18 has a projection part 18e that is an engagement part projected to the front side rather than the end face 18d. The fourth group barrel 4 has a projection part 4f that is a regulation part projected to the backside. When the fourth group barrel 4 is close to the filter frame 18 to be in the overlap state, the projection part 18e can engage with the projection part 4f.

For example, when the fourth group barrel 4 and the filter frame 18 are in the overlap state and the infrared cut filter 23 is in the insertion state as shown in FIG. 6B, even if receiving a force in the Z direction, displacement of the filter frame 18 is regulated because the projection part 18e contacts with a lower end in the drawing of the projection part 4*f*. On the other hand, when the fourth group barrel 4 and the filter frame 18 are in the overlap state and the infrared cut filter is in the removal state as shown in FIG. 6C, even if receiving a returning force in the direction opposite to the Z direction, displacement of the filter frame 18 is regulated because the projection part 18*e* contacts with an upper end in the drawing of the projection part 4*f*. This avoids an unexpected contact between the fourth group barrel 4 and the filter frame 18 (including the infrared cut filter 23).

That is, if there are no measures, when an impact is applied to the lens barrel, the filter frame 18 may move in the direction that intersects perpendicularly with the optical axis C. If the filter frame 18 displaces under the state where the fourth group barrel 4 is close to the filter frame 18, the filter frame 18 may be caught by the fourth group barrel 4, the filter frame 18 and the fourth group barrel 4 may be locked mutually and may be inoperative even if it is going to drive after that, and the lens may be damaged. Since the projection part 18*e* and the projection part 4*f* are provided, the problems, such as in operation and damage, are avoidable.

On the other hand, when the fourth group barrel 4 and the filter frame 18 are not in the overlap state and are in the positional relationship where the infrared cut filter 23 is able to insert to and remove from the optical path, the projection part 18*e* cannot contact with the projection part 4*f*. For example, when the fourth group barrel 4 and the filter frame 18 are not in the overlap state as shown in FIG. 6A, the fourth group barrel 4 never interferes with the filter frame 18. Accordingly, the projection part 18*e* and the projection part 4*f* are provided so that they are in the positional relationship where they never contact with each other in such a state.

Figure 7:
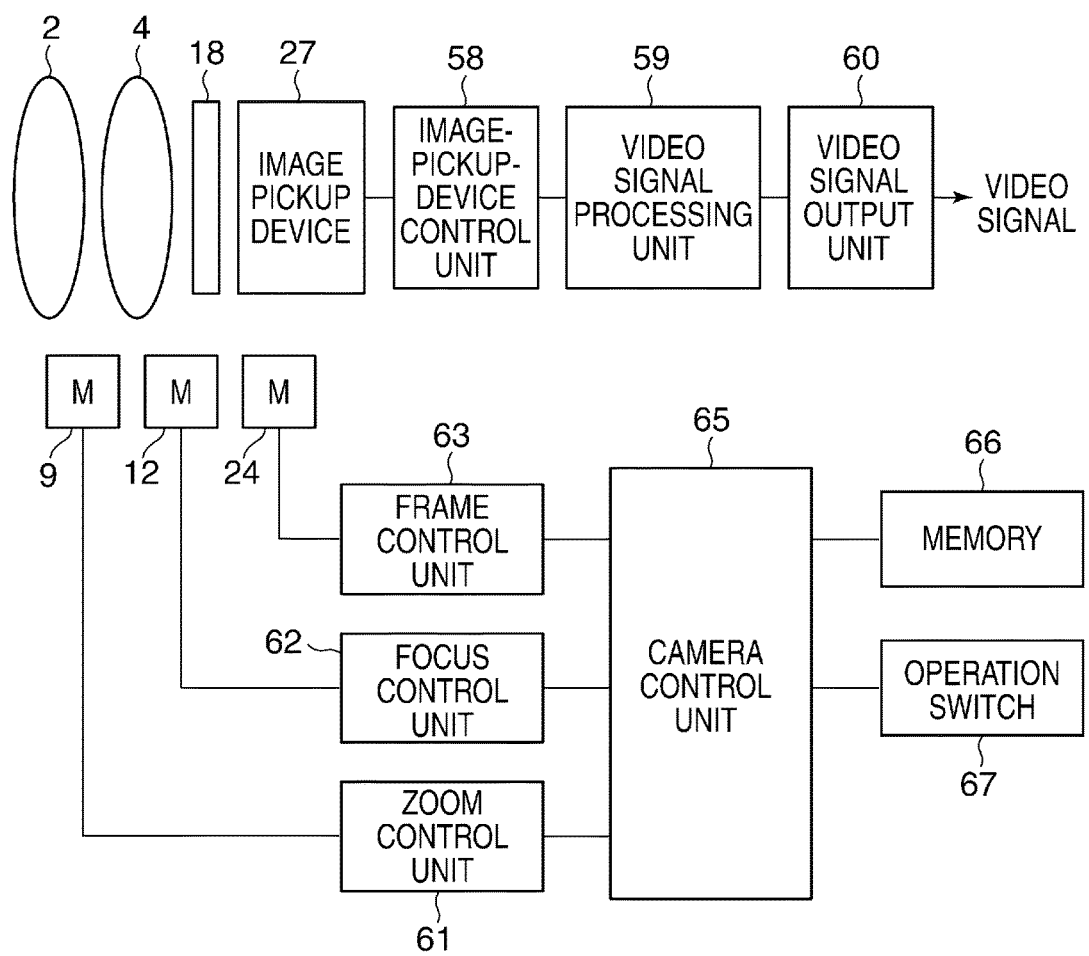
FIG. 7 is a block diagram showing a control system of an image pickup apparatus in which the lens barrel shown in FIG. 1 is incorporated.

FIG. 7 is a block diagram schematically showing a control system of the image pickup apparatus. The image pickup apparatus has an image-pickup-device control unit 58, a video signal processing unit 59, and a video signal output unit 60 in addition to the second group barrel 2, the fourth group barrel 4, the filter frame 18, the image pickup device 27, the Z motor 9, the F motor 12, and the frame motor 24. Furthermore, the image pickup apparatus has a zoom control unit 61, a focus control unit 62, a frame control unit 63, the camera control unit 65, a memory 66, and an operation switch 67. The Z motor 9 drives the second group barrel 2 in the optical axis direction for a zoom operation according to the control signal from the zoom control unit 61. The F motor 12 drives the fourth group barrel 4 in the optical axis direction for a focusing operation according to the control signal from the focus control unit 62. The frame motor 24 drives the filter frame 18 in response to the control signal from the frame control unit 63, and accordingly the infrared cut filter 23 held by the filter frame 18 is inserted into the optical path or is removed from the optical path. The camera control unit 65 controls the Z motor 9, F motor 12, and frame motor 24 through the zoom control unit 61, focus control unit 62, and frame control unit 63, respectively, to drive the second group barrel 2, fourth group barrel 4, and filter frame 18, respectively. The camera control unit 65 plays a role of a control unit.

Incident light from the object side passes the second group barrel 2 and the fourth group barrel 4. When the infrared cut filter 23 is inserted into the optical path, the incident light enters into the image pickup device 27 through the infrared cut filter 23. When the infrared filter 23 is removed from the optical path, the incident light directly enters into the image pickup device 27 through the opening 18*b* of the filter frame 18. The image pickup device 27 converts the incident light into an analog electric signal under control of the image-pickup-device control unit 58. The video signal processing unit 59 applies a signal process to the analog signal, and the video signal output unit 60 outputs a color or monochrome video signal according to the processed signal. The camera control unit 65 receives the signal from the video signal processing unit 59 and outputs the control signals to the zoom control unit 61, focus control unit 62, and frame control unit 63.

The memory 66 stores the positional information about the second group barrel 2, the control states of the fourth group barrel 4 and the filter frame 18 through the camera control unit 65, and stores predetermined set values. The operation switch 67 is used when a user gives various instructions. For example, the user is able to select the day mode or the night mode using the operation switch 67. The day mode is a photographing mode in which a taken image that emphasizes color reproducibility of an object by inserting the infrared cut filter 23 into the optical path is obtained so as not to enter the infrared light into the image pickup device 27. The night mode is a photographing mode in which a taken image that emphasizes object illuminance by removing the infrared cut filter 23 from the optical path is obtained so that the infrared light besides the visible light enter into the image pickup device 27.

Figure 8:
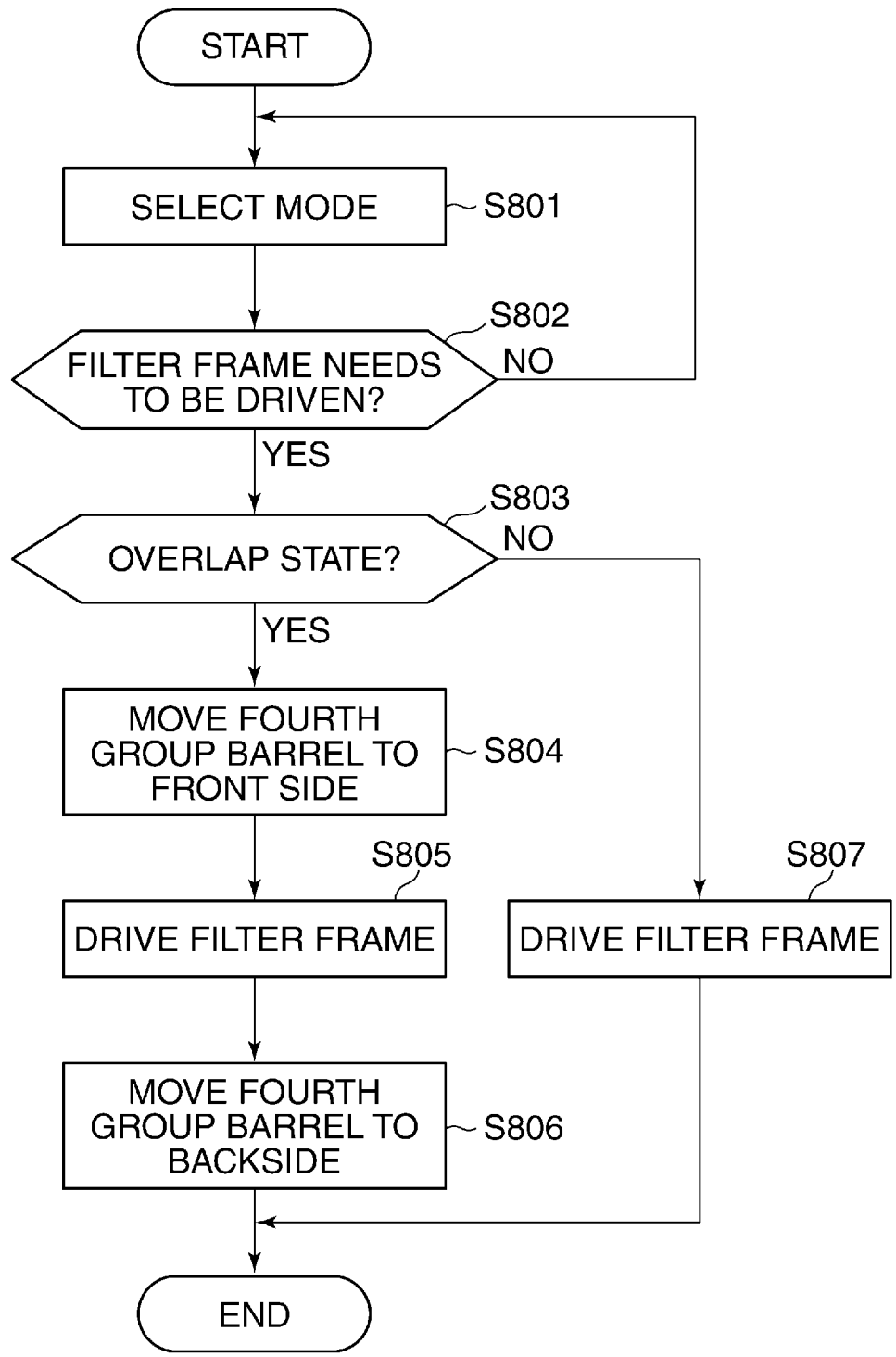
FIG. 8 is a flowchart showing a mode process executed by a camera control unit shown in FIG. 7.

FIG. 8 is a flowchart showing a mode process. A process in this flowchart is achieved when a CPU of the camera control unit 65 reads and runs a program stored in a storage unit, such as ROM, of the camera control unit 65. This processing will be started when the power of the image pickup apparatus is turned ON.

The camera control unit 65 receives selection of the photographing mode (the day mode or the night mode) by an operation of the operation switch 67 in step S801 first. In the next step S802, the camera control unit 65 determines whether the filter frame 18 needs to be driven according to the current photographing mode and the selected photographing mode. Specifically, when the current photographing mode is the same as the selected photographing mode, it is unnecessary to insert or remove the infrared cut filter 23, and it is determined that the filter frame 18 does not need to be driven. On the other hand, when the current photographing mode is the day mode and the selected photographing mode is the night mode, it is necessary to remove the infrared cut filter 23 from the optical path, and it is determined that the filter frame 18 needs to be driven. Moreover, when the current photographing mode is the night mode and the selected photographing mode is the day mode, it is necessary to insert the infrared cut filter 23 into the optical path, and it is determined that the filter frame 18 needs to be driven.

As a result of the determination in the step S802, when the filter frame 18 does not need to be driven, the process returns to the step S801. On the other hand, when the filter frame 18 needs to be driven, the process proceeds to step S803. In the step S803, the camera control unit 65 determines whether the fourth lens group 34 and the filter frame 18 are in the overlap state. This is determined on the basis of the number of pulses supplied to the F motor 12 that is a stepping motor. When the number of pulses falls within a predetermined range, it is determined that they are in the overlap state. It should be noted that a sensor that detects the position of the fourth group barrel 4 in the optical axis direction may be provided, and it may be determined whether they are in the overlap state according to whether the position of the fourth group barrel 4 falls within a predetermined range. It should be noted that the above-mentioned number of pulses or the above-mentioned predetermined range for the determination is stored in the memory 66.

As a result of the determination in the step S803, when the fourth lens group 34 and the filter frame 18 are not in the overlap state, displacement of the filter frame 18 in such a state does not cause interference with the fourth group barrel 4. Accordingly, the camera control unit 65 controls the frame control unit 63 to drive the frame motor 24 so as to displace the filter frame 18 in the direction corresponding to the selected photographing mode to insert or remove the infrared cut filter 23 (step S807). That is, when changing from the night mode to the day mode, the camera control unit 65 displaces the filter frame 18 so as to insert the infrared cut filter 23 into the optical path. Moreover, when changing from a day mode to a night mode, the camera control unit 65 displaces the filter frame 18 so that the infrared cut filter 23 may be evacuated from an optical path. Then, the process in FIG. 8 finishes.

On the other hand, as a result of the determination in the step S803, when the fourth lens group 34 and the filter frame 18 are in the overlap state, displacement of the filter frame 18 in such a state may cause interference with the fourth group barrel 4. Accordingly, the camera control unit 65 proceeds with the process to step S804, and drives the fourth group barrel 4 in the direction away from the image pickup device 27 (to the front side) in the optical axis direction. That is, the camera control unit 65 calls the set value stored in the memory 66 by the focus control unit 62. Then, the camera control unit 65 makes the focus control unit 62 output the control signal to drive the F motor 12 so that the fourth group barrel 4 moves by an amount corresponding to the called set value. Accordingly, the fourth group barrel 4 moves to the predetermined position at which the fourth group barrel 4 and the filter frame 18 are not in the overlap state. In the next step S805, the camera control unit 65 controls the frame control unit 63 to drive the frame motor 24 so as to displace the filter frame 18 in the direction corresponding to the selected photographing mode to insert or remove the infrared cut filter 23 as with the step S807.

In the next step S806, the camera control unit 65 drives the image pickup device 27 in the direction approaching the fourth group barrel 4 (to the back side) in the optical axis direction. The position of the fourth group barrel 4 after the movement differs from the position of the fourth group barrel 4 before the movement in the step S804. As mentioned above, the focused position of the fourth group barrel 4 varies according to the wavelength of the light that enters into the image pickup device 27. Accordingly, the suitable positions of the fourth group barrel 4 before and after the removal of the infrared filter 23 in a case where the day mode is changed to the night mode are different from the suitable positions of the fourth group barrel 4 before and after the insertion of the infrared filter 23 in a case where the night mode is changed to the day mode. The position of the fourth group barrel 4 after the insertion or removal of the infrared cut filter 23 is determined in consideration of the position correction amount of the focusing lens in visible light environment or infrared light environment as described in the publication described as the conventional example. Although the camera control unit 65 may calculate and determine the position of the fourth group barrel 4 in the process in the step S806, a correlation between the positions of the fourth group barrel 4 before and after the insertion or removal of the infrared cut filter 23 may be stored in the memory 66 beforehand, and the position may be determined on the basis of the correlation. Then, the process in FIG. 8 finishes.

When the fourth group barrel 4 is located at a position where it will interfere with the filter frame 18 during displacement of the filter frame 18, the fourth group barrel 4 is moved to the position where interference will not occur, and then, the filter frame 18 is driven.

According to the embodiment, the camera control unit 65 inserts and removes remove the infrared cut filter 23 into and from the optical path of the image pickup optical system. In that case, the camera control unit 65 determines whether the fourth group barrel 4 (including the fourth lens group 34) and the filter frame 18 (including the infrared cut filter 23) are in the overlap state when viewing in the direction that intersects approximately perpendicularly with the optical axis direction. When they are in the overlap state, the camera control unit 65 moves the fourth lens group 34 to the position where they are not in the overlap state, and then, inserts or removes the infrared cut filter 23. This avoids the interference even when the design that arranges the filter frame 18 extremely close to the fourth group barrel 4 in the optical axis direction is employed, which is advantageous to shorten the length of the lens barrel. That is, it contributes to miniaturization of the lens barrel while employing the insertion-removal mechanism for the infrared cut filter 23. Accordingly, the mode in which the infrared cut filter is used and the mode in which it is not used are achievable and the size in the optical axis direction is compacted.

Moreover, after inserting or removing the infrared cut filter 23 into or from the optical path, the camera control unit 65 moves the fourth group barrel 4 to the position where they are in the overlap state. At this time, the camera control unit 65 moves the fourth lens group 34 to the position, which is different from the position before the insertion or removal of the infrared cut filter 23, according to the selected photographing mode. Accordingly, the fourth lens group 34 can be promptly moved to the in-focus position corresponding to each of the day mode and the night mode.

Moreover, when the fourth group barrel 4 and the filter frame 18 are in the overlap state, the projection part 18e of the filter frame 18 engages with the projection part 4f of the fourth group barrel 4, which regulates the displacement of the infrared cut filter 23 in the direction that changes the insertion/removal state to the optical path. Accordingly, it is avoidable that the fourth group barrel 4 interferes with the filter frame 18 due to unexpected displacement of the filter frame 18.

Although the fourth lens group 34 that is the focusing lens is exemplified as the first optical element that is driven in the optical axis direction of the image pickup optical system in the embodiment, the first optical element is not limited to the focusing lens. Moreover, although the infrared cut filter 23 is exemplified as the second optical element that is driven in the direction that intersects approximately perpendicularly with the optical axis, the second optical element is not limited to the infrared light removal filter. Accordingly, a configuration that moves the first optical element to the position where the interference does not occur first at the time of the insertion and removal of the second optical element is sufficient, in the relationship between the first optical element and its holder that are movable in the optical axis direction and the second optical system and its holder that are inserted and removed.

It should be noted that a filter of which type is different from the infrared cut filter 23 may be attached to the opening 18b of the filter frame 18 so as to arrange one of the filters in the optical path selectively.

It should be noted that the example that applies the present invention to the image pickup apparatus in which the lens barrel is built is described in the embodiment. In this case, the zoom control unit 61, the focus control unit 62, the frame control unit 63, and the function that controls these units of the camera control unit 65 may be arranged in either of the lens barrel and the body of the image pickup apparatus. Alternatively, the present invention may be applied to a lens barrel as what is called an interchangeable lens. In that case, the image pickup device 27, image-pickup-device control unit 58, video signal processing unit 59, and video-signal-output-unit 60 may be provide in a body of an image pickup apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-136009, filed Jul. 8, 2016, which is hereby incorporated by reference herein in its entirety.

What is claimed is:

1. A lens barrel comprising:
   a first optical element;
   a first drive mechanism that moves said first optical element in an optical axis direction of an image pickup optical system;
   a second optical element that is located at an image surface side of said first optical element and is selectively inserted in an optical path of the image pickup optical system;
   a holding member that holds said second optical element;
   a second drive mechanism that moves said holding member in a direction different from an optical axis; and
   a control unit that controls said first drive mechanism and said second drive mechanism,
   wherein, in a case where said second drive mechanism removes said second optical element from the optical path in the state that said first optical element and said holding member are in an overlap state when viewing in a direction that intersects perpendicularly with the optical axis, the control unit controls said first drive mechanism to move said first optical element to an object side to a position where said first optical element and said holding member are not in the overlap state, and then controls said second drive mechanism to remove said second optical element from the optical path.

2. The lens barrel according to claim 1, wherein said control unit controls said first drive mechanism to move said first optical element to the object side to the position where said first optical element and said holding member are not in the overlap state, controls said second drive mechanism to remove said second optical element from the optical path, and then controls said first drive mechanism to move said first optical element to the image surface side.

3. The lens barrel according to claim 1, wherein said control unit controls said first drive mechanism to move said first optical element to the object side to the position where said first optical element and said holding member are not in the overlap state, controls said second drive mechanism to remove said second optical element from the optical path, and then controls said first drive mechanism to move said first optical element to the image surface side to a position where said first optical element and said holding member are in the overlap state.

4. The lens barrel according to claim 1, wherein said control unit controls said first drive mechanism so that the position of said first optical element that is moved to the image surface side in the optical axis direction after removing said second optical element is different from the position of said first optical element before moving to the object side for removing said second optical element.

5. The lens barrel according to claim 1, wherein said first optical element is provided with a regulation part that regulates the movement of said holding member in a direction that intersects perpendicularly with the optical axis,
   wherein said holding member is provided with an engagement part, and
   wherein the regulation part engages with the engagement part to regulate displacement of said second optical element in the direction different from the optical axis when said first optical element and said holding member are in the overlap state.

6. The lens barrel according to claim 1, wherein said first optical element is a focusing lens.

7. The lens barrel according to claim 1, wherein said second optical element is an infrared light removal filter.

* * * * *